(12) United States Patent
Lee et al.

(10) Patent No.: US 10,442,692 B2
(45) Date of Patent: Oct. 15, 2019

(54) MANUFACTURING METHOD OF ALUMINIUM NITRIDE AND ALUMINUM NITRIDE PREPARED BY THE SAME

(71) Applicants: Alcom, Ot (KR); Senus Corp., Bucheon (KR)

(72) Inventors: Kon-Bae Lee, Seoul (KR); Jae-Pyoung Ahn, Seoul (KR); Hae Sung Kim, Seoul (KR)

(73) Assignees: ALCOM, Incheon (KR); SENUS Corp., Bucheon (KR)

(*) Notice: Subject to any disclaimer, the term of this patent is extended or adjusted under 35 U.S.C. 154(b) by 227 days.

(21) Appl. No.: 15/164,887

(22) Filed: May 26, 2016

(65) Prior Publication Data
US 2017/0260050 A1 Sep. 14, 2017

(30) Foreign Application Priority Data
Mar. 10, 2016 (KR) .................. 10-2016-0028867

(51) Int. Cl.
*C01B 21/072* (2006.01)
(52) U.S. Cl.
CPC ...... *C01B 21/0722* (2013.01); *C01P 2002/72* (2013.01); *C01P 2004/03* (2013.01)
(58) Field of Classification Search
None
See application file for complete search history.

(56) References Cited

U.S. PATENT DOCUMENTS

| 2003/0099590 A1* | 5/2003 | Miura | C01B 21/0722 423/412 |
| 2004/0022715 A1* | 2/2004 | Miura | C01B 21/0722 423/412 |
| 2012/0263620 A1* | 10/2012 | Carberry | F41H 5/02 419/66 |

FOREIGN PATENT DOCUMENTS

| EP | 1310455 A1 | 5/2003 |
| JP | 61-083608 A | 4/1986 |
| JP | 62-003007 A | 1/1987 |
| KR | 10-1989-0002053 B1 | 6/1989 |

OTHER PUBLICATIONS

G. Selivaduray, L. Sheet, "Aluminum Nitride: Review of Synthesis Methods", Mater. Sci. Tech-Lond., 1993, vol. 9, pp. 463-473.
J. Haibo, K. Chen, Z. Heping, S. Agathopoulos, O. Fabrichnaya, J.M.Ferreira, "Direct Nitridation of Molten Al(Mg,Si) Alloy to aluminum nitride", J. Cryst. Growth, 2005, vol. 281, pp. 639-645.
(Continued)

*Primary Examiner* — Guinever S Gregorio
(74) *Attorney, Agent, or Firm* — GW Suh Patent Services

(57) ABSTRACT

The present invention relates to a method of manufacturing aluminum nitride and aluminum nitride prepared by the same. Pure aluminum powder having a median particle size (D50) of 1.52 μm was heated to a temperature in a range of 595° C.~900° C. in a nitrogen containing atmosphere comprising nitrogen and argon gases, at atmospheric pressure for one hour to obtain aluminum nitride with a degree of nitridation exceeding 93%. According to the present invention aluminum nitride may be produced with high yield using a simple and inexpensive one-step heating method in a relatively short period of time.

8 Claims, 3 Drawing Sheets

(56) References Cited

OTHER PUBLICATIONS

T. Okada, M. Toriyama, S. Kanzaki, "Direct Nitridation of Aluminum Compacts at Low Temperature", J. Mater., Sci., 2000, vol. 35, pp. 3105-3111.
A.J. Chang, S.W. Rhee, S.G. Baik, "Kinetics and Mechanisms for Nitridation of Floating Aluminum Powder", J. Am. Ceram. Soc., 1995, vol. 78, pp. 33-40.
Q. Zheng, B. Wu, R.G. Reddy, Adv. Eng. Mater., 2003, vol. 5, pp. 167-172.
A.V. Korhunov, "Influence of Dispersion Aluminum Powders on the Regularities of Their Interaction with Nitrogen", Russ. J. Phys. Chem. A, 2011, vol. 85, pp. 1202-1210.
T. Okada, M. Toriyama, S. Kanzaki, "Synthesis of Aluminum Nitride Sintered Bodies Using the Direct Nitridation of Al Compacts", J. European Ceram. Soc., 2000, vol. 20, pp. 783-787.

* cited by examiner

MANUFACTURING METHOD OF ALUMINIUM NITRIDE AND ALUMINUM NITRIDE PREPARED BY THE SAME

CROSS REFERENCES TO PRIOR APPLICATIONS

This application claims priority of Korean Patent Application No. 10-2016-0028867 filed on Mar. 10, 2016, which is hereby incorporated by reference in its entirety.

BACKGROUND OF INVENTION

The present invention relates to a method for manufacturing aluminum nitride with high yield using a one-step heating process of nitriding aluminum at temperatures below the melting point of aluminum at atmospheric pressure and aluminum nitride manufactured by the same.

Aluminum nitride possesses high thermal conductivity (320 W/m·K, ten times higher than that of alumina), high electrical insulation ($9 \times 10^{13}$ Ω·cm and low thermal expansion coefficient ($4 \times 10^{-6}$/° C.) which is close to that of silicon as well as other superior properties such as mechanical strength and chemical stability. For such reasons, aluminum nitride is widely used as thermal barrier materials, semiconductor and compound semiconductor substrates and as a reinforcing phase in composite materials. Recently, its use has been broadened to heat dissipating materials in LED devices because of its high thermal conductivity and low thermal expansion coefficient.

A variety of methods have been developed for the manufacturing of aluminum nitride up to now. Today, commercially available aluminum nitride is produced by either the Direct Nitridation Method or the Carbothermal Reduction Reaction. Direct Nitridation Method has the advantage of employing cheaper starting materials and producing aluminum nitride powders at a lower manufacturing temperature with a relatively simple process compared to the Carbothermal Reduction Reaction.

The direct nitridation reaction of aluminum powder occurs in accordance with the following scheme and is known to be thermodynamically possible at temperatures as low as room temperature and higher.

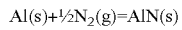

$Al(s) + \tfrac{1}{2}N_2(g) = AlN(s)$

It is worthy to note that the above reaction is highly exothermic and is accompanied by a considerable amount of heat. As a result, unreacted aluminum melted by the reaction heat coalesces and thus causes to impede further nitridation by blocking diffusion pathways for the supply of nitrogen gas. To prevent this, commercial direct nitridation methods employ prolonged heating at highly elevated temperatures of 1,000° C.~2,000° C. for the complete nitridation of coalesced aluminum.

In addition, commercial direct nitridation methods repeatedly perform nitridation and pulverization of the aluminum nitride produced to increase overall yield or otherwise require further processing steps such as the addition of aluminum tri-fluoride ($AlF_3$) or aluminum nitride (AlN) to facilitate the completion of the reaction. This could have negative side effects. During the pulverization process, for instance, the content of impurities such as oxygen may buildup and have a negative effect on thermal conductivity of the end product. In addition, the required additional processing steps may further increase the overall cost of manufacturing.

The direct nitridation method employs nitrogen or ammonium gas which reacts directly with aluminum powder to produce aluminum nitride. Accordingly, it is extremely difficult to control impurity contents to under several weight percent because unreacted aluminum is constantly being introduced as an impurity during the pulverization process as described in Korean Patent KR 10-1989-0002053 B1.

Direct nitridation methods typically use aluminum particles with a diameter less than 400 μm and conduct a nitridation treatment at temperatures from 900° C. to 1,400° C. before pulverizing and milling the aluminum nitride produced. In order to increase the degree of nitridation, crushed aluminum flakes are mixed together with aluminum nitride particles and then the mixed powder is used as a starting material. Another way to increase the degree of nitridation is to subject aluminum particles less than 250 μm in diameter to an initial nitridation treatment below the melting temperature of aluminum then pulverize the resulting aluminum nitride to an average particle size of 15 μm in diameter before subjecting the particles to an additional step of nitridation treatment at a temperature of 1,300° C.~1,400° C. as described in Japanese Patent JP 61-083608 A. Still another way to increase the degree of nitridation is to add an ammonium compound containing fluorine and aluminum nitride powder to pure aluminum powder, then blending the mixture and heating it to a temperature of 430° C.~650° C. for the initial nitridation treatment then repeating an additional step of nitridation at a temperature of 900° C.~1,300° C. as according to Japanese Patent JP 62-003007 A.

European patent application EP 1,310,455 A1 discloses a process of manufacturing aluminum nitride in a specially designed furnace under nitrogen pressure falling in a range from 105 to 300 kPa for 30~120 minutes before conducting nitridation at 500° C. to 1,000° C. It further discloses that fine aluminum nitride powder was obtained by supplying a reaction controller gas (argon or ammonia) into the reaction chamber to control the temperature at which nitridation took place whenever the temperature of the powder increased or nitrogen gas pressure in the reaction chamber decreased as the nitridation reaction proceeded.

As can be seen, up until now, known manufacturing methods of aluminum nitride using the Direct Nitridation Method feature heating for prolonged periods of time at temperatures much higher than the melting point of aluminum or heating at much lower temperatures but at higher pressures that require special equipment or multiple steps. Aluminum nitride particles exposed to such high temperatures tend to undergo self-sintering, which calls for additional high energy pulverizing processes to break them up, thus adding to overall cost. Likewise, a necessity for high pressure equipment adds to initial investment costs and employing multiple heating steps to increase yield impairs productivity since it requires additional operations and hence more time.

Since particle size of aluminum significantly influences an ensuing nitridation process it is very important to determine the particle size distribution of the initial aluminum particles involved in the process. In the present invention, the description of volume distribution of the particles is adopted using at least a median D50 value. Occasionally, though, to provide more detail, three values of size; D10, D50 and D90 are used. D50 is the median in which half of the population of particles lies below this value. Similarly 90 percent of the distribution lies below the value D90 and 10 percent of the particle population lies below the value D10. A three point specification as such is considered complete and more than appropriate for describing the size of powder materials involved for the purpose of explaining the present invention.

The present invention enables manufacturing aluminum nitride with a high yield by way of a single-step heating process at a temperature which is lower than the melting point of aluminum at atmospheric pressure in a relatively short amount of time.

SUMMARY OF INVENTION

The present invention relates to a process for manufacturing aluminum nitride (AlN) economically at high yield (over 93% degree of nitridation) using a single-step heating process at a temperature lower than the melting point of aluminum at atmospheric pressure and aluminum nitride prepared by the same.

One aspect of the present invention may comprise a method of manufacturing aluminum nitride comprising the step of heating a pure aluminum powder having a median particle size (D50) of 1.52 μm to a temperature within a range of 595° C.~900° C., in a nitrogen containing atmosphere at atmospheric pressure for one hour so that a degree of nitridation of at least 93% is attained. Preferably, the pure aluminum particles may have a size distribution profile in which D10=0.65 μm, D50=1.52 μm and D90=2.98 μm.

Another aspect of the present invention may comprise a method of manufacturing aluminum nitride comprising the step of heating a pure aluminum powder having a median particle size (D50) 4.58 μm to a temperature within a range of 640° C.~900° C. in a nitrogen containing atmosphere at atmospheric pressure for one hour so that a degree of nitridation of at least 93% is attained. Preferably, the pure aluminum particles may have a size distribution profile in which D10=2.48 μm, D50=4.58 μm and D90=7.82 μm.

Further, the present invention may in effect comprise a method of manufacturing aluminum nitride comprising the step of heating a pure aluminum powder having a median particle size (D50) within a range of 1.53 μm~4.58 μm to a temperature within a range of 640° C.~900° C. in a nitrogen containing atmosphere at atmospheric pressure for one hour so that a degree of nitridation of at least 93% is attained.

Still another aspect of the present invention may comprise a method of manufacturing aluminum nitride comprising the step of: heating a pure aluminum powder comprising a mixture of median particles sizes (D50); the first median particle size comprising D50=1.52 μm, the second median particle size comprising D50=4.58 μm and the third median particle size comprising D50=10.37 μm, respectively; to a fixed temperature of 650° C., and preferably to at least 700° C. in a nitrogen containing atmosphere at atmospheric pressure for a duration of one hour so that a degree of nitridation of at least 93% is attained.

In such case, a composition ratio of the first, second and third median particles sizes of the pure aluminum powder mixture may comprise 25~40 wt. %:25~40 wt. %:20~50 wt. %, respectively. The sequence of mixing the aluminum particles of various sizes may be performed in any order.

For any aspect of the present invention set forth above, the nitrogen containing atmosphere may comprise 50~100 percent of nitrogen gas wherein the nitrogen containing atmosphere may comprise a mixture with argon gas.

Further, for any aspect of the present invention set forth above, a flow rate of pure nitrogen gas of the nitrogen containing atmosphere may comprise 2~6 liters/min.

Yet another aspect of the present invention may comprise aluminum nitride manufactured according to any aspect mentioned above.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of examples or embodiments, it should be understood that it is not intended to limit the scope of the invention to these particular examples or embodiments.

DETAILED DESCRIPTION OF THE PRESENT INVENTION

Figure 1:
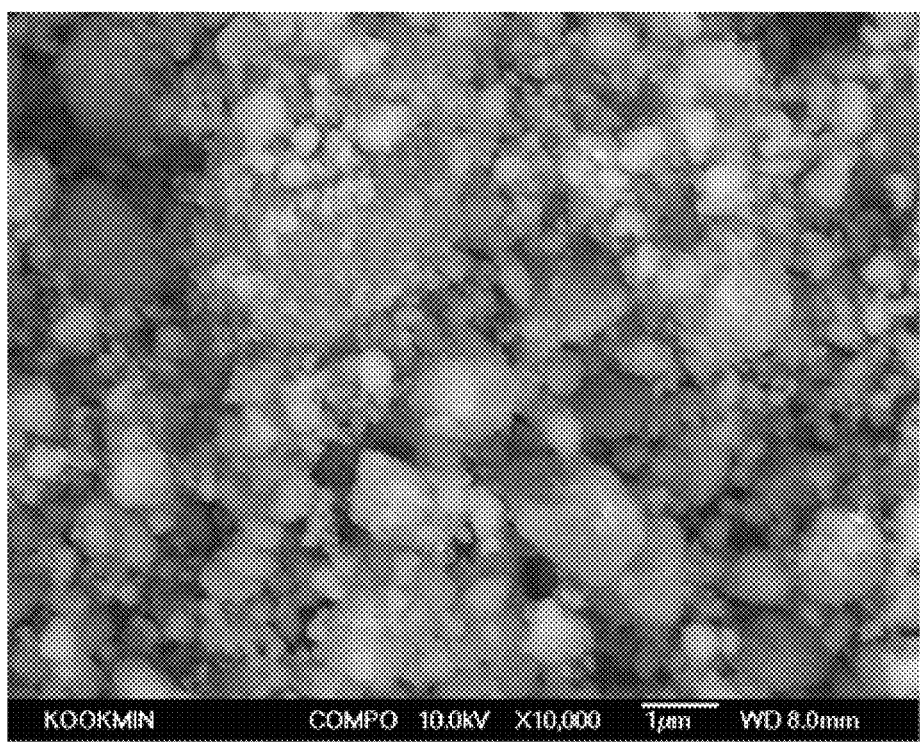
FIG. 1 shows a scanning electron microscopy (SEM) image of aluminum nitride powder manufactured according to Example 1.

In the following description, for the purposes of explanation, specific details and examples are set forth in order to provide an understanding of the invention. It will be appreciated, however, by one skilled in the art that the invention can be practiced without these details. One skilled in the art will recognize that exemplary embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Furthermore, connections between method steps are not restricted to connections that are effected directly. Instead, connections between method steps may be modified or otherwise changed through the addition thereto of intermediary method steps, without departing from the teachings of the present invention.

The present invention relates to a method for manufacturing aluminum nitride cost effectively with high yield in a short period of time using a simple one-step heating process at a temperature starting from below the melting temperature of pure aluminum and extending to higher temperatures at atmospheric pressure.

The method is characterized by pure aluminum powder having a particular median size (D50) or that comprising a mixture of median sizes (D50) being directly exposed to a nitrogen atmosphere at a moderately elevated temperature so that both may react during a substantially short period of time to produce aluminum nitride with high yield (exceeding 93% degree of nitridation).

The present invention allows manufacturing aluminum nitride at a relatively low temperature and in a relatively short period of time in a single-step heating process using commonly known equipment and procedures in the art.

The temperature was measured using a thermocouple directly in contact with the reaction container, in which the nitriding reaction of pure aluminum took place. Furnace settings were controlled using this temperature. A heating rate of 5° C./min was employed starting from room temperature to a pre-determined target temperature and was then held at that temperature for at least 0.5 hours.

Nitrogen containing atmosphere refers to an atmosphere in which pure nitrogen gas is continuously supplied to the reaction container such that it can react directly with the aluminum powder to form aluminum nitride. Nitrogen containing atmosphere may comprise a pure nitrogen gas atmosphere or comprise a mixture of a nitrogen and an argon gas atmosphere, although the mixture is not limited to just these gases. Preferably the nitrogen containing atmosphere is a mixture of a nitrogen and an argon gas.

When aluminum powder reacts with nitrogen gas to form aluminum nitride, there are various factors that may influence the conversion of aluminum to aluminum nitride i.e. degree of nitridation, such as (particle) size of aluminum powder, mixing ratio of different particle sizes of aluminum powder, heating temperature, duration of heating, and nitrogen gas concentration. The key and most influential of these factors is the particle size of aluminum powder.

It is desirable to maintain the median particle size (D50) of the aluminum powder in a range of 1.52 μm~4.58 μm. When the median particle size of the aluminum powder is within this range, almost all aluminum powder is converted to aluminum nitride by heating it to a temperature as low as 595° C. (for D50=1.52 μm) and the degree of nitridation exceeds 93%, importantly, in a relatively short period of time of one hour. In case the median particle size (D50) of aluminum powder is larger than 10 μm, the degree of nitridation becomes markedly decreased.

The smaller particle sizes of pure aluminum powder used as a starting material is significant because the larger surface area provided by the smaller aluminum particles enables reaction with the nitrogen gas for nitridation more readily possible, thereby eliminating the need for an intermediate or a pre-treatment step such as the occlusion of nitrogen. In addition, it is also considered that the amount of unreacted molten aluminum decreases as particle sizes decrease.

A degree of nitridation refers to the rate aluminum is converted to aluminum nitride. It is also known as a nitriding ratio. In theory, a complete conversion of aluminum to aluminum nitride would lead to about 52% increase in total weight. In reality, though, when aluminum nitride is manufactured from aluminum powder below 1,000° C. by the Direct Nitridation Method, it is not possible to attain 100% nitridation because molten aluminum coalesces and block pathways of the nitrogen supply before nitridation is fully complete. However, using a starting material of small median (D50) sized particles or a mixture of several small median (D50) sized particles resulted in almost all the aluminum converting to aluminum nitride except for that located in a limited area confined to the powder bed surface which is in contact with the nitrogen containing atmosphere. Here the degree of nitridation was not as high as the middle sections of the bed due to the instantaneous decrease in nitrogen gas as nitridation initiated. Nevertheless, the overall degree of nitridation exceeded 93% even though nitridation at the powder bed surface was not fully complete. Thus, it is worthy to note that almost complete nitridation was achieved in the middle sections of the powder bed demonstrating the merits of the present invention.

The degree of nitridation may be calculated from the weight change of the crucible containing the aluminum powder before and after heating (nitridation).

A first aspect of the present invention involves using pure aluminum powder with a size distribution profile of D10=0.65 μm, D50=1.52 μm and D90=2.98 μm (hereinafter 'Powder P1'). When using said aluminum 'Powder P1', it was possible to manufacture aluminum nitride with a degree of nitridation higher than 93%, by heating the aluminum particles to a temperature in a range of 595° C.~900° C. in a mixed atmosphere of nitrogen and argon for 1 hour at atmospheric pressure. It is worth noting that it was possible to attain a degree of nitridation that was higher than 93% with a single-step heating process at a relatively low temperature of 595° C., in a relatively short period of time of 1 hour.

A second aspect of the present invention involves using aluminum powder with a size distribution profile of D10=2.48 μm, D50=4.58 μm and D90=7.82 μm (hereinafter 'Powder P2'), When using said aluminum 'Powder P2', it was possible to manufacture aluminum nitride with a degree of nitridation higher than 93%, by heating the aluminum particles to a temperature in a range of 640° C.~900° C. in a mixed atmosphere of nitrogen and argon for 1 hour at atmospheric pressure. Again, it is worthy to note that it was possible to attain a degree of nitridation that was higher than 93% with a single-step heating process at a relatively low temperature of 640° C., in a relatively short period of time of 1 hour.

In the range of median particle sizes (D50) which were used for the present invention, there was a tendency, as later shown in Table 1, in which the lowest possible temperature of obtaining at least 93% degree of nitridation, decreased with decreasing median particle size (D50) of the pure aluminum powder used. This is attributed to the larger surface area provided by the smaller aluminum particles that enable reaction with the nitrogen gas for nitridation more readily possible. In addition, it is also thought to be attributed to a decrease in the amount of unreacted molten aluminum as particle sizes decrease.

Experimental data provided in the present invention effectively supports that the present invention involves a method of manufacturing aluminum nitride comprising the step of heating a pure aluminum powder having a median particle size (D50) in the range of 1.53 μm~4.58 μm to a temperature within a range of 640° C.~900° C. in a nitrogen containing atmosphere at atmospheric pressure for one hour so that a degree of nitridation of at least 93% is attained.

There is an important reason for using a gaseous mixture of nitrogen and argon as the nitriding atmosphere here. In case only nitrogen is used, the nitrogen content within the reaction container decreases abruptly at the initiation of nitridation creating an instantaneous state of vacuum, which may reverse the flow of nitrogen from the dispensing apparatus of the reaction container. This may, in turn, cause external air or vapor to enter into the system and sharply increase oxygen content within the container, which eventually inhibits nitridation of the aluminum powder. Such effects are concentrated and more pronounced near the powder bed surface where consequently nitridation may not fully complete.

To resolve this issue, an inert gas such as argon was mixed with the nitrogen gas and consequently prevented an instantaneous drop of pressure within the reaction container.

Introduction of the argon gas may start as soon as the temperature reaches the target heating temperature (e.g. 595° C.), or may be introduced at the initiation of the process as the starting material begins to be heated from room temperature.

Nitrogen content of the mixed gas atmosphere of argon and nitrogen may be 50~100 volume percent. For example, at nitrogen content of 50 volume percent, nitridation did not decrease or stop and the degree of nitridation of aluminum was higher than 93%. These results exhibit very high yield in a very short amount of time.

In the present invention, a nitrogen gas flow rate of at least 2 liters/min was used for the nitridation of aluminum powder. Preferably the nitrogen gas flow rate is in a range of 2~6 liters/min. In case the flow rate nitrogen gas is less than 2 liters/min, the degree of nitridation of aluminum powder may decrease because of a decrease in nitrogen supply.

In terms of required pressure, the argon-nitrogen mixed gas atmosphere may be maintained at atmospheric pressure. In other words, it was not necessary to utilize additional cost adding steps or processes such as pressurization of the nitrogen gas in the reaction container to augment nitrogen supply. A degree of nitridation of at least 93% was attained at atmospheric pressure for the conditions set forth in the present invention.

Nitridation is a very intense exothermic reaction. In theory, nitridation of 1 kg of aluminum powder generates approximately, 2,800 kcal ($\approx 1.172 \times 10^4$ kJ) of heat. When nitridation initiates at one portion of the aluminum powder bed, the nitriding reaction proceeds quickly in succession to other portions because of the reaction heat resulting in a sudden temperature rise in the aluminum powder bed. Such rise in temperature may commonly exceed 1,000° C., in which case an undesirable coarsening of the aluminum nitride particles due to crystal growth and sintering might occur. It is therefore desirable to suppress the exothermal reaction as much as possible and try to ensure that nitridation occurs at a lower temperature.

One of the most important features of the present invention is that it allows manufacturing aluminum nitride at a relatively low temperature and in a relatively short period of time in a single-step heating process.

As for duration of heating, it is preferable to heat the starting material and maintain it at a pre-determined temperature (e.g. 595° C.) for a duration of at least 0.5 hours. In other words, it is possible to obtain quality aluminum nitride with over 93% degree of nitridation by heating the aluminum powder to a pre-determined temperature (e.g. 595° C.) and holding it there for as little as 0.5 hours and preferably 1 hour.

In short, the manufacturing method for aluminum nitride according to the present aspect of the invention is heating aluminum particles of a single median size (D50) to a pre-determined temperature (e.g. 595° C.) in a nitrogen containing atmosphere and holding it for at least 0.5 hours. It is preferable to keep the duration of nitridation within one hour upon reaching the lowest possible nitriding reaction temperature which is determined by the size of the aluminum particles involved.

In a third aspect, aluminum powder of different median sizes (D50) may be mixed before being used. The degree of nitridation may be vastly improved by mixing, for instance, aluminum powder having a median diameter (D50) of 10.37 μm (coarse particles) with aluminum powder having a median diameter (D50) of 1.52 μm~4.58 μm (fine particles).

Thus, a degree of nitridation exceeding 93% may be achieved not only by using aluminum powder of a single median size (D50) but also by mixing aluminum powders having different median sizes (D50).

More specifically, if one mixes aluminum powder having a distribution profile of 'Powder P1' with that having a distribution profile of 'Powder P2' and further with that having a distribution profile of D10=6.76 μm, D50=10.37 μm, D90=15.86 μm (hereinafter, 'Powder P3') and then heats it to a temperature of 650° C., and preferably to at least 700° C. in a nitrogen containing atmosphere at atmospheric pressure for 1 hour, one can obtain aluminum nitride with a degree of nitridation exceeding 93%.

The composition of the powder mixture may be such that the ratio of the median sizes of aluminum particles for 'Powder P1': 'Powder P2': 'Powder P3' may be 25~40 weight percent: 25~40 weight percent: 20~50 weight percent, respectively.

Still another aspect of the present invention comprises aluminum nitride manufactured by any of the said aspects described above. The degree of nitridation of the aluminum nitride according to the present aspect may be higher than 93%.

The present invention is further described in detail via examples and comparative examples described below. However, the scope of the invention is not limited to these examples.

Examples 1-10 and Comparative Examples 1-5

In this set of examples, the manner in which aluminum nitride formation is influenced by particle size of aluminum powder is demonstrated.

100 g of pure aluminum powder (99.75%, HENAN YUANYANG ALUMINUM INDUSTRY CO. LTD, 'Powder P1' was used in examples 1~6 and comparative example 1; 'Powder P2' was used for examples 7~10 and comparative example 2; and 'Powder 3' was used for comparative examples 3~5) was weighed and poured into crucibles, respectively, after which they were heated to a temperature in a range of 595° C.~900° C. with a heating rate of 5° C./min in a nitrogen containing atmosphere at atmospheric pressure and held for 1 hour as shown in Table 1. The flow rate of nitrogen gas was set at 2 liters/min. In order to eliminate the possible effect of nitriding during cooling in the furnace, specimens used in all of the examples were immediately removed from the furnace and air-cooled outside of the furnace.

Powder P1 has a particle size distribution profile of D10=0.65 μm, D50=1.52 μm, D90=2.98 μm and D100=4.68 μm.

Powder P2 has a particle size distribution profile of D10=2.48 μm, D50=4.58 μm, D90=7.82 μm and D100=11.61 μm.

Powder P3 has a particle size distribution profile of D10=6.76 μm, D50=10.37 μm, D90=15.86 μm and D100=24.65 μm.

Table 1 shows the minimum temperature at which nitridation occurs based on aluminum particle size and corresponding degrees of nitridation. Degree of nitridation was determined by measuring the weight difference of the crucible containing the powders before and after heating.

Referring to Table 1, only when the median particle size (D50) of the aluminum powder is less than 4.58 μm and the temperatures are above 640° C. does the degree of nitridation exceed 94%, practically reaching near complete nitridation of the aluminum powder. In case the median particle size of the aluminum powder was larger than 10 μm, however, it was confirmed that near complete nitridation of the aluminum powder did not occur even at a higher temperature of 900° C. Depending on the particle size of the aluminum powder, there was a minimum temperature at which near complete nitridation could occur. That minimum temperature decreased with decreasing particle size of the aluminum powder, as shown in Table 1.

TABLE 1

| | Median Diameter (D50) of Al Particle (μm) | Temperature (° C.) | Degree of Nitridation (%) |
|---|---|---|---|
| Comparative Example 1 | 1.52 | 590 | 44.7 |
| Example 1 | | 595 | 95.4 |
| Example 2 | | 620 | 95.4 |
| Example 3 | | 640 | 94.6 |
| Example 4 | | 700 | 94.4 |
| Example 5 | | 800 | 96.1 |
| Example 6 | | 900 | 93.6 |
| Comparative Example 2 | 4.58 | 620 | 12.0 |
| Example 7 | | 640 | 95.6 |
| Example 8 | | 700 | 93.4 |
| Example 9 | | 800 | 93.8 |
| Example 10 | | 900 | 96.1 |
| Comparative Example 3 | 10.37 | 700 | 42.2 |
| Comparative Example 4 | | 800 | 48.6 |
| Comparative Example 5 | | 900 | 46.8 |

Experimental data shown in Table 1. effectively supports that a one-step heating process of a pure aluminum powder having a median particle size (D50) that falls within a range of 1.53 μm~4.58 μm to a temperature within a range of 640° C.~900° C. in a nitrogen containing atmosphere at atmospheric pressure for one hour yields aluminum nitride with a degree of nitridation of at least 93%.

FIG. 1 shows a scanning electron micrograph of aluminum nitride powder crushed by a mortar and pestle from an aluminum nitride nugget manufactured according to Example 1. Small particles approximately the size of 1 μm were observed and confirmed to be aluminum nitride by EDS analysis (not shown).

Figure 2:
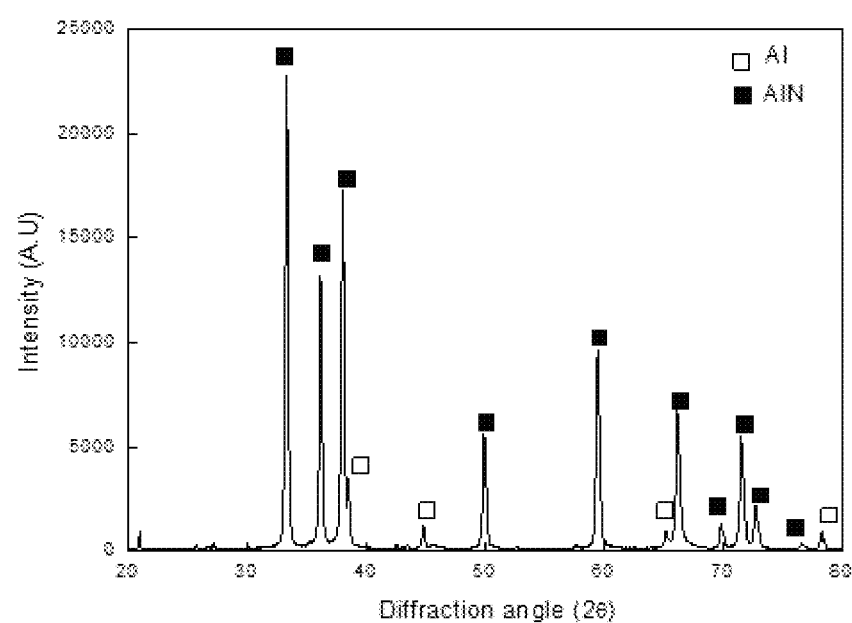
FIG. 2 shows an X-ray diffraction (XRD) pattern of aluminum nitride powder manufactured according to Example 1.

FIG. 2 shows an XRD pattern results on the said powder according to Example 1. Peaks corresponding to aluminum nitride as well as aluminum can be observed in FIG. 2, which reflects the results of a degree of nitridation of 95.4% as opposed to complete 100% nitridation.

Example 11

Example 11 was prepared exactly according to Example 1 except for mixing argon gas to the nitrogen atmosphere as heating was initiated. Approximately 100 g of pure aluminum powder (HENAN YUANYANG ALUMINUM INDUSTRY CO. LTD; 99.75%, median particle diameter D50=1.52 μm; 'Powder P1') was weighed into a crucible and heated to 595° C. with a heating rate of 5° C./min in a mixed atmosphere of nitrogen (2 liters/min) and argon (1 liter/min) at atmospheric pressure and held there for one hour before being cooled to room temperature. In order to eliminate the possible effect of nitriding during cooling in the furnace, the specimen used in example 11 was immediately removed from the furnace and air-cooled outside of the furnace.

The degree of nitridation was 98.7% which was 3.3% higher than that of Example 1 obtained without introducing argon. The higher degree of nitridation is attributed to the introduction of argon gas as may be explained as follows.

Immediately upon the initiation of nitridation, nitrogen within the container is consumed rapidly and causes an abrupt pressure drop of nitrogen gas or an instant vacuum. As a result, surrounding atmosphere including oxygen is drawn into the container and impedes the nitridation of aluminum to full completion. This is why complete nitridation does not occur and stops at approximately 96% (as shown in Table 1). This problem, however, can be overcome by introducing an inert gas such as argon as heating begins or before the pressure drop of nitrogen takes place to suppress such sudden changes in pressure and thus eventually improve the overall degree of nitridation as was obtained in Example 11.

Figure 3:
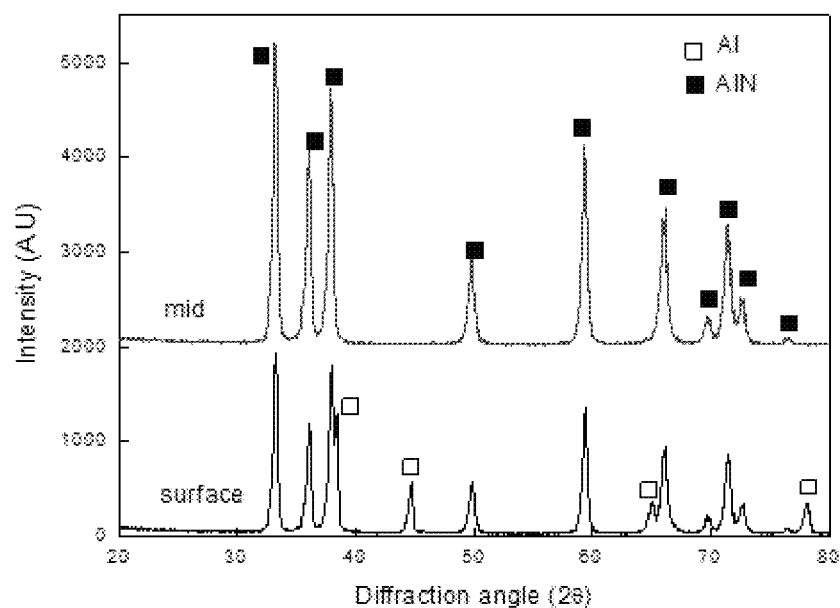
FIG. 3 shows an X-ray diffraction (XRD) pattern of an aluminum nitride nugget manufactured according to Example 11.

FIG. 3 illustrates XRD patterns of a cutoff surface (surface) and mid-section (mid) of an aluminum nitride nugget obtained according to Example 11. Referring to FIG. 3, peaks corresponding to aluminum could be observed on the surface section whereas only peaks corresponding to aluminum nitride could be observed in the mid-section of the nugget. It was therefore possible to confirm that almost complete nitridation occurred in the mid-section of the nugget whereas nitridation did not fully complete only on the surface.

Example 12-13

In this set of examples, nitridation was performed according to the same method as that of Example 8, except for changing the flow rate of nitrogen to 1, 2 and 6 liters/min to see the influence of nitrogen flow rate on nitridation of aluminum. The results are shown in Table 2. For reasons of comparison, results of Example 8 are also shown in Table 2.

TABLE 2

| | Median Diameter of Al Particle, D50 (μm) | Temperature (° C.) | Nitrogen Flow Rate (liter/min) | Degree of Nitridation (%) |
|---|---|---|---|---|
| Example 12 | 4.58 | 700 | 1 | 80.9 |
| Example 8 | 4.58 | 700 | 2 | 93.4 |
| Example 13 | 4.58 | 700 | 6 | 95.4 |

Referring to Table 2, it can be seen that degree of nitridation begins to decrease when the flow rate of nitrogen gas falls below 2 liters/min. Therefore it is preferable to maintain a nitrogen gas flow rate of at least 2 liters/min.

Comparative Examples 6-7, Examples 14-17

In this set of examples, aluminum particles of different median (D50) sizes were mixed together for conducting nitridation as opposed to previous examples in which aluminum particles of only a single median (D50) size was used. The sequence of mixing the aluminum particles of various sizes may be performed in any order.

Powders P1, P2 and P3 were mixed according to the compositions listed in Table 3 and then heated to 700° C. in nitrogen atmosphere (flow rate=2 liters/min) at atmospheric pressure for a duration of one hour before cooling to room temperature. In order to eliminate the possible effect of nitriding during cooling in the furnace, the specimens used in all the examples were immediately removed from the furnace and air-cooled outside of the furnace.

TABLE 3

| | Al Powder Ratio (wt. %) | | | Degree of Nitridation (%) at 700° C. |
|---|---|---|---|---|
| | Powder P1 | Powder P2 | Powder P3 | |
| Comparative Example 6 | 10 | 10 | 80 | 64.4 |

TABLE 3-continued

|  | Al Powder Ratio (wt. %) | | | Degree of Nitridation (%) at 700° C. |
| --- | --- | --- | --- | --- |
|  | Powder P1 | Powder P2 | Powder P3 |  |
| Comparative Example 7 | 15 | 15 | 70 | 88.0 |
| Example 14 | 25 | 25 | 50 | 97.1 (95.6*) |
| Example 15 | 30 | 30 | 40 | 93.6 |
| Example 16 | 35 | 35 | 30 | 93.1 |
| Example 17 | 40 | 40 | 20 | 93.6 |

*Degree of nitridation for same example at 650° C.

In Table 3, degrees of nitridation of various mixtures of aluminum powder in terms of their median particle sizes (D50) are listed. Referring to Table 3, Example 14 in which 100 g of an aluminum powder mixture was prepared according to a P1:P2:P3 ratio of 25 wt. %:25 wt. %:50 wt. %, and then heated to 700° C. in a nitrogen containing atmosphere at atmospheric pressure for one hour produced a very high degree of nitridation of 97.1%. This is in stark contrast with the low degree of nitridation (46.8%) obtained using only aluminum particles having a median (D50) size of approximately 10 μm and heating it to 900° C. in a nitrogen containing atmosphere according to Comparative Example 5 provided in Table 1.

In addition, in a separate run, the same Example 14 was heated to 650° C. in a nitrogen containing atmosphere at atmospheric pressure for one hour under the same conditions and delivered a nitridation rate of 95.6%. Thus, the aluminum powder mixture according to a P1:P2:P3 ratio of 25 wt. %:25 wt. %:50 wt. % exhibited an excellent degree of nitridation at a temperature as low as 650° C., which is just below the melting point of aluminum.

What is claimed is:

1. A method of manufacturing aluminum nitride comprising the step of:
   heating a pure aluminum powder comprising a mixture of median particles sizes (D50);
   a first median particle size comprising D50=1.52 μm, a second median particle size comprising D50=4.58 μm and a third median particle size comprising D50=10.37 μm, respectively;
   to a fixed temperature in a nitrogen containing atmosphere at one atmospheric pressure for a duration of 1 hour so that a degree of nitridation of at least 93% is attained;
   wherein the fixed temperature comprises at least 700° C.;
   wherein a composition ratio of the first, second and third median particle sizes of the pure aluminum powder mixture comprises 25~40 wt. %:25~40 wt. %:20~50 wt. %, respectively.

2. The method according to claim 1, wherein
   the nitrogen containing atmosphere comprises 50-100 volume percent of a pure nitrogen gas.

3. The method according to claim 2, wherein
   the nitrogen containing atmosphere comprises a mixture of nitrogen and argon gas.

4. The method according to claim 1, wherein
   a flow rate of nitrogen gas in the nitrogen containing atmosphere is maintained at 2-6 liters/min.

5. A method of manufacturing aluminum nitride comprising the step of:
   heating a pure aluminum powder comprising a mixture of median particles sizes (D50);
   a first median particle size comprising D50=1.52 μm, a second median particle size comprising D50=4.58 μm and a third median particle size comprising D50=10.37 μm, respectively;
   to a fixed temperature in a nitrogen containing atmosphere at one atmospheric pressure for a duration of 1 hour so that a degree of nitridation of at least 93% is attained;
   wherein the fixed temperature comprises at least 650° C.;
   wherein a composition ratio of the first, second and third median particle sizes of the pure aluminum powder mixture comprises 25 wt. %:25 wt. %:50 wt. %, respectively.

6. The method according to claim 5, wherein
   the nitrogen containing atmosphere comprises 50-100 volume percent of a pure nitrogen gas.

7. The method according to claim 6, wherein
   the nitrogen containing atmosphere comprises a mixture of nitrogen and argon gas.

8. The method according to claim 5, wherein
   a flow rate of nitrogen gas in the nitrogen containing atmosphere is maintained at 2-6 liters/min.

* * * * *